US006980606B2

(12) United States Patent
Otte et al.

(10) Patent No.: US 6,980,606 B2
(45) Date of Patent: Dec. 27, 2005

(54) DEVICE FOR RECONSTRUCTING A RUNLENGTH CONSTRAINED SEQUENCE

(75) Inventors: Rob Otte, Eindhoven (NL); Willem Marie Julia Marcel Coene, Eindhoven (NL); Johannes Wilhelmus Maria Bergmans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 727 days.

(21) Appl. No.: 09/969,002

(22) Filed: Oct. 2, 2001

(65) Prior Publication Data

US 2002/0041641 A1    Apr. 11, 2002

(30) Foreign Application Priority Data

Aug. 10, 2000  (EP) .................... 00203490

(51) Int. Cl.[7] ............................................. H03D 1/00
(52) U.S. Cl. ................. 375/341; 375/262; 375/265; 375/240; 714/769; 714/794
(58) Field of Search .................. 375/341, 240, 375/262, 265; 714/769, 794

(56) References Cited

U.S. PATENT DOCUMENTS

| | | | | |
|---|---|---|---|---|
| 6,088,404 A | * | 7/2000 | Jekal | 375/341 |
| 6,256,352 B1 | * | 7/2001 | Chang | 375/240.26 |
| 6,807,653 B2 | * | 10/2004 | Saito | 716/2 |
| 2002/0152441 A1 | * | 10/2002 | Senda et al. | 714/769 |

FOREIGN PATENT DOCUMENTS

| | | | | |
|---|---|---|---|---|
| EP | 0813308 | | 12/1997 | ......... H03M 13/00 |
| EP | 1024603 A2 | * | 8/2000 | ......... H03M 13/41 |

* cited by examiner

Primary Examiner—Shuwang Liu
Assistant Examiner—Eva Zheng

(57) ABSTRACT

A branch metric calculation unit calculates a set of branch metric values for subsequent samples of the sampled input signal. Each of the set of branch metric values is an indication for the likelihood that an amplitude value of a sample corresponds to a particular state, a state being defined as a sequence of n-ary digits. A delay unit, which forms part of a delay chain of delay units, includes a first delay unit of the delay chain which is coupled to the branch metric calculation unit. A path metric calculation chain of path metric calculation units includes one or more path metric calculation units having first inputs coupled to a delay unit and second inputs coupled to a preceding path metric calculation unit. The path metric calculation unit calculates the path metric values from the branch metric values, a path metric value being on indication for the likelihood that a sequence of samples corresponds to a sequence of states.

9 Claims, 8 Drawing Sheets

DEVICE FOR RECONSTRUCTING A RUNLENGTH CONSTRAINED SEQUENCE

The invention pertains to a device for reconstructing a runlength constrained sequence of n-ary digits from an analog input signal representing said device comprising
 an input for receiving said signal,
 a sampling unit for taking time-discrete samples of the input signal,
 a branch metric calculation unit for calculating a set of branch metric values for subsequent samples of the sampled input signal, each of the set of branch metric values being an indication for the likelihood that an amplitude value of a sample corresponds to a particular state, a state being defined as a sequence of n-ary digits,
 a delay unit for delaying metric values,
 a path metric calculation unit, coupled to the delay unit, for calculating path metric values out of the branch metric values, a path metric value being an indication for the likelihood that a sequence of samples corresponds to a sequence of states,
 an output for providing the reconstructed runlength constrained sequence of n-ary digits.

The invention further pertains to an apparatus for reproducing a record carrier comprising said device.

The invention also pertains to a device for reproducing a transmitted signal.

In transmission and storage channels which suffer from inter symbol interference and noise, sequence bit detectors are often preferred over per sample detectors such as the threshold detector to improve the bit-error rate. Usually, the well known Viterbi search algorithm is used to find the most likely sequence from the large set of all possible sequences.

Figure 1A:
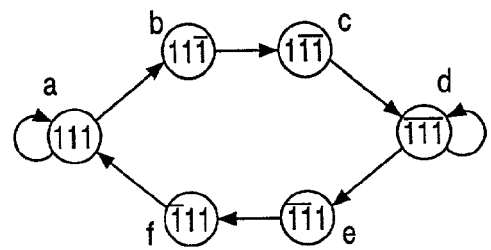

By way of example the known implementation of 3-taps Viterbi detection of a d=2 run length limited (RLL) code (e.g. EFM+ in case of DVD) is described below. The state diagram and trellis of a 3-taps detector for a d=2 RLL code are respectively shown in FIGS. 1A and 1B. In this case 6 possible states (a–f) of the input signal are distinguished. Each of the states a–f correspond to a sequence of n-ary digits, in this case bits as indicated in FIG. 1A. Each of the sequences on its turn entails a specific level in the eye pattern, the so-called reference level (rl_a, . . . , rl_f). The reference levels are known or estimated from the input signal. A path metric (PMs,n) is associated with each state (St). These are calculated by adding the path metric (PMs, n−1) of the previous states and the branch metrics (BMs,n) derived from the n-th input sample (Ssn) and the reference levels (rl). In case of a state (a,d) with more than one potential predecessor, the predecessor with the smallest path metric is selected first, the predecessor state is stored to facilitate back tracking later on. The path metrics are calculated by means of a pathmetric calculation unit 5 which is described in more detail with reference to FIG. 2. The path metric calculation unit shown in FIG. 2 comprises addition units 50b, 50c, 50e, 50f to calculate the path metric value for the states b, c, e and f. The addition unit 50b is shown in more detail in FIG. 3A. The addition units 50c, 50e, 50f are identical thereto. The pathmetric calculation unit 5 further comprises compare select addition units 50a,50d. One of the compare select addition units 50a is shown in more detail in FIG. 3B. The other compare select addition unit 50d is identical to unit 50a. Furthermore the compare select addition units 50a, 50d provide an output signal $PD_a$, $PD_d$ indicating which of the predecessors of the states a and d have the smallest path metric value. As shown in FIG. 2, in the known detector the outputs of the pathmetric calculation unit 5 are coupled to the inputs thereof via a delay unit 55 and a normalize unit 59. The latter unit 59 prevents that the set path-metric values grow unlimited, for example by subtracting the smallest value of this set from the other values. In this way the shortest path metric value $PM_a$, . . . $PM_f$ for each of the states a, . . . ,f is calculated recursively. As is also shown in FIG. 2, the pathmetric calculation unit 5 is coupled to a minimum detector 7. The latter selects the state Smin which has the smallest pathmetric value. The pathmetric calculation unit 5 and the minimum detector are coupled to a back tracking unit 8. The backtracking unit 8 comprises a first delay chain with delay units 81a, . . . , 81d, which each delay the predecessor information $PD_a$ by one clock cycle and with delay units 82a, . . . , 82d, which each delay the predecessor information $PD_d$ by one clock cycle. In the known detector only one clockcycle is available for the recursive calculation of the pathmetric value for each of the states. It is therefore a drawback of the known detector that the calculation of the pathmetric value seriously restricts the attainable speed of the device.

It is a purpose of the invention to provide a measure for the device described in the opening paragraph which overcomes this drawback. According to the invention the device is characterized in that the delay unit forms part of a chain of delay units, a first delay unit of the chain being coupled to the branch metric calculation unit, and in that the path metric calculation unit forms part of a chain of path metric calculation units, the chain comprising path metric calculation units having first inputs coupled to the delay units and second inputs coupled to outputs of a previous path metric calculation unit.

In the device according to the invention the path metric value for each state is estimated from a set of branch metric values within a time-window. It has been found by the inventors that this estimation is reliable as the part of the trellis in the deep past does not contribute to the bit detection and can therefore be omitted. The chain of delay units and the chain of path metric calculation units form a pipelined structure. This makes it possible that a plurality of clockcycles corresponding to the length of these chains is available for calculating the path metric values. Calculation of the pathmetric value no longer restricts the attainable speed of the device so that the detection process is significantly increased. In addition, because the pathmetric value is calculated as the sum from a predetermined number of branchmetric values, a normalization step is superfluous.

In the device according to the invention the branch metric values within a particular time-window are all available simultaneously. This makes it possible to calculate the path metric values in any order. Embodiments thereof are described by claims 2 and 3.

The embodiment of claim 4 is particularly favorable as therein a backtracking unit is superfluous.

The device according to the invention is in particular suitable for use in an apparatus for reproducing a record carrier.

Furthermore the device according to the invention is suitable for use in a receiver for reproducing a transmitted signal.

Figure 2:
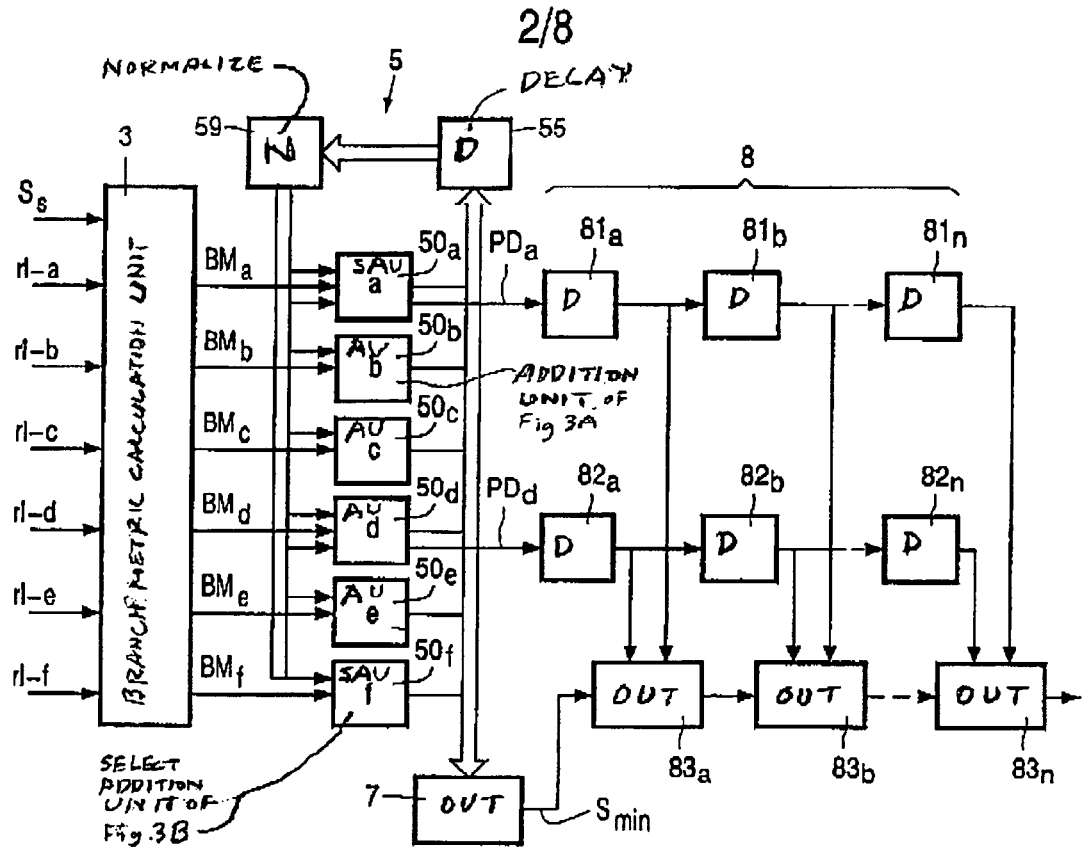
Figure 3A:
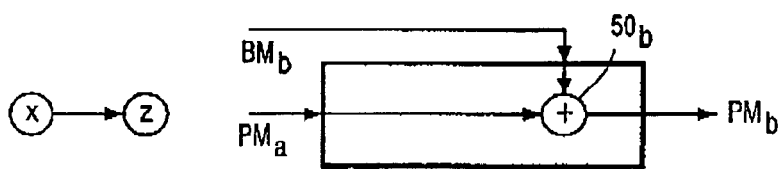
Figure 3B:
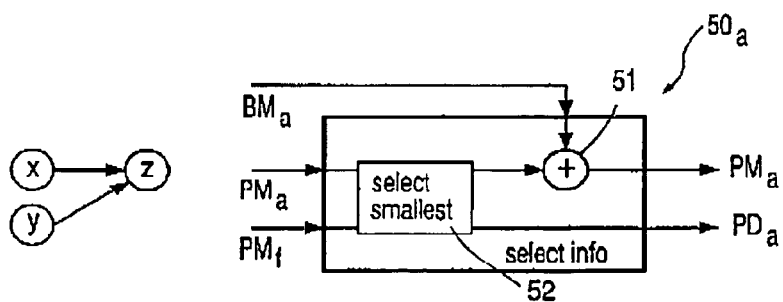
Figure 5:
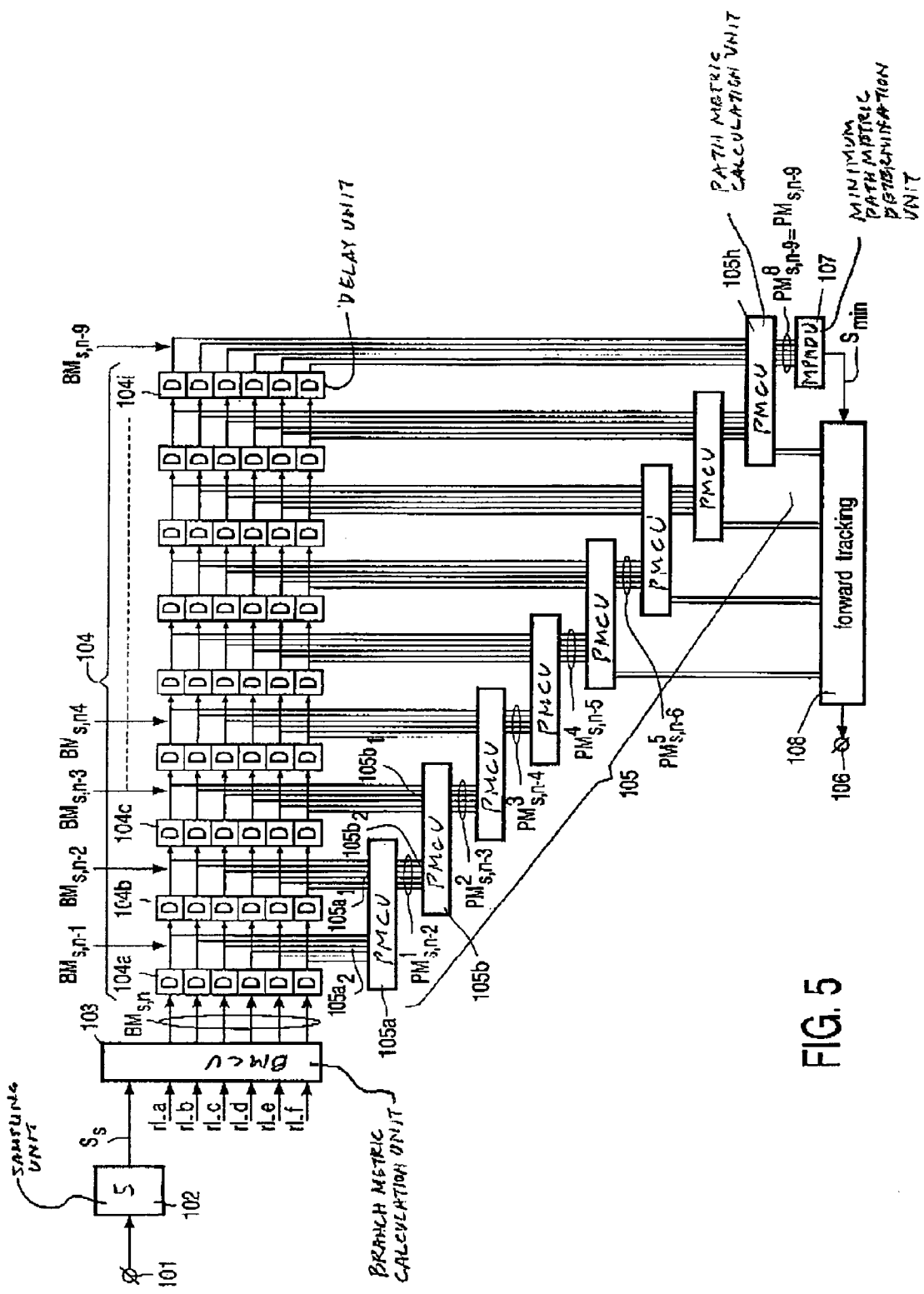
Figure 5A:
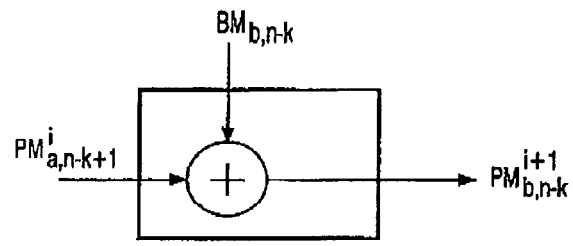
Figure 5B:
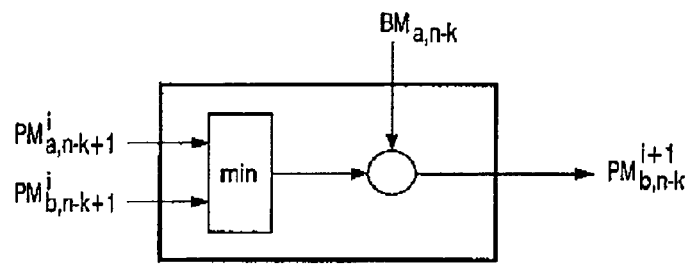
Figure 6A:
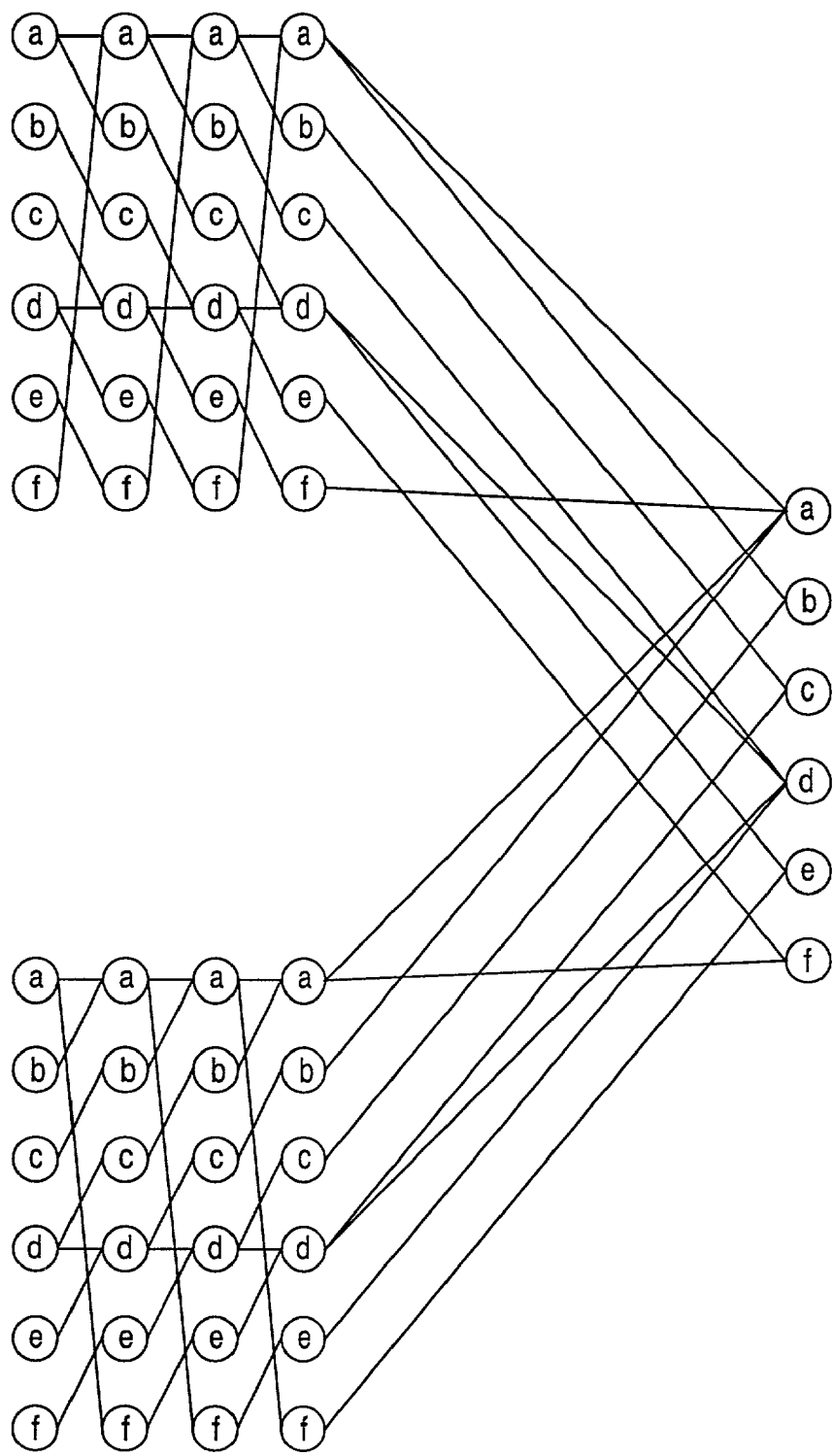
Figure 6B:
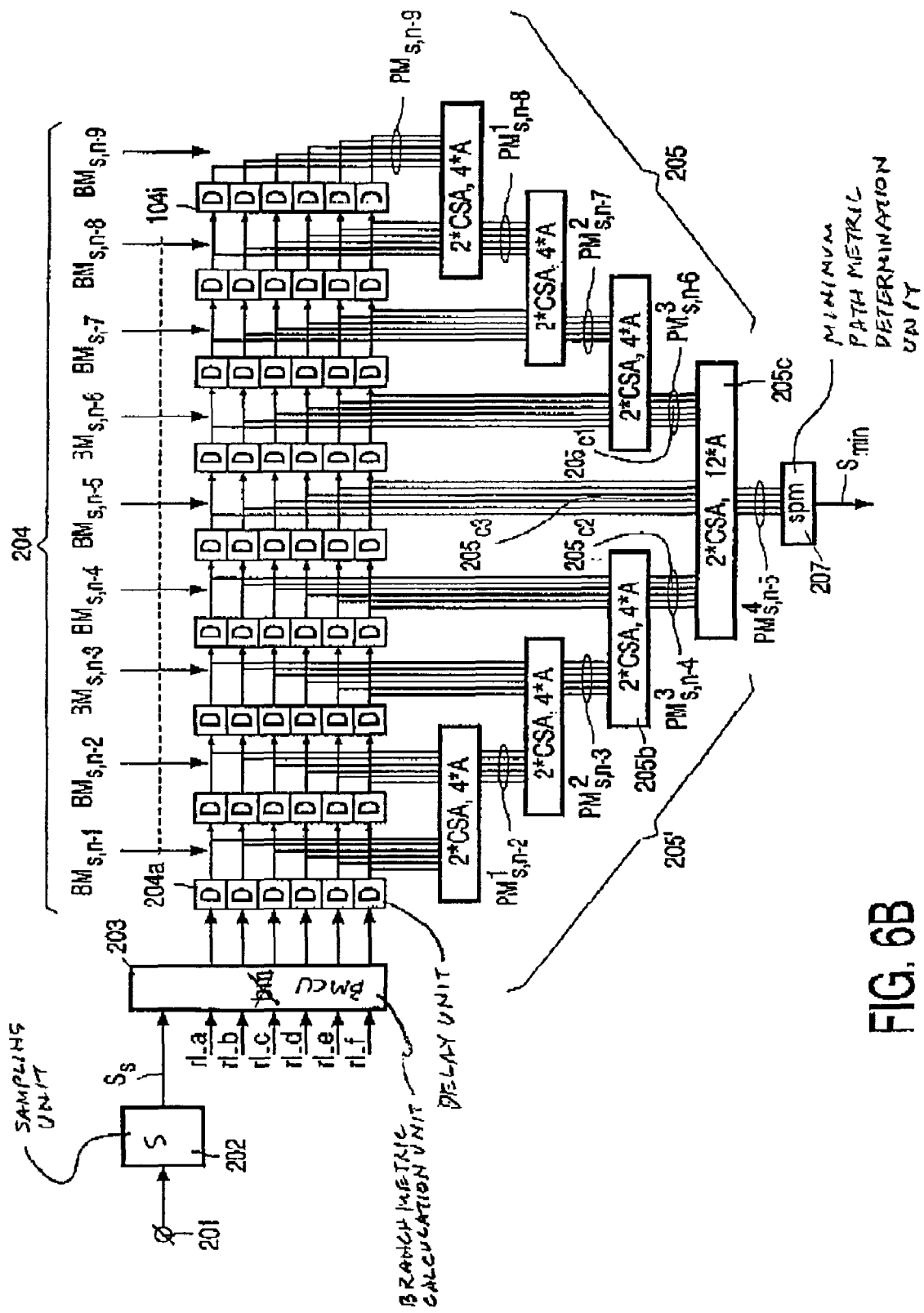
Figure 8:
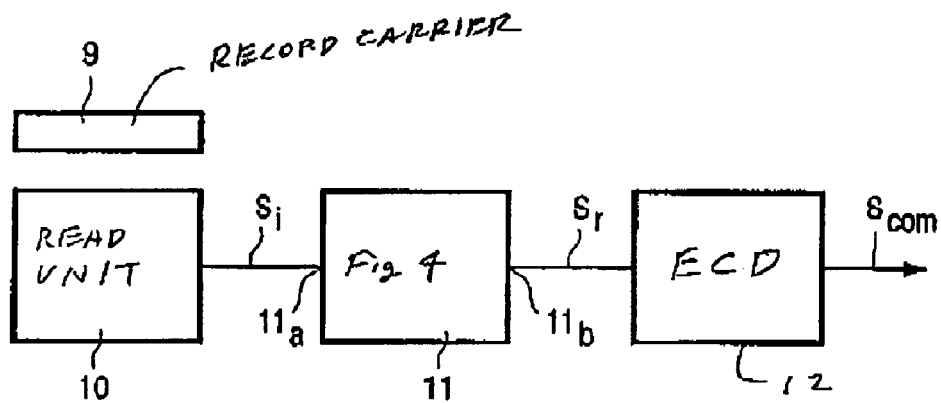
Figure 9:
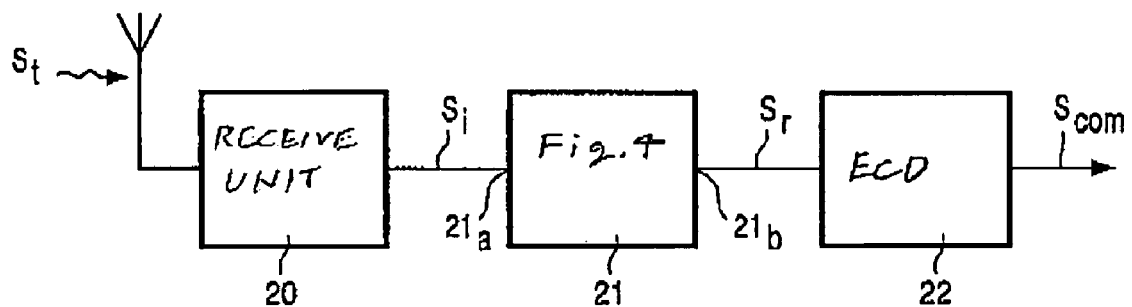

These and other aspects are described in more detail with reference to the drawing. Therein FIGS. 1A and 1B respectively show a state diagram and a trellis of a 3-taps detector for a d=2 RLL code, FIG. 2 shows a unit of a conventional device comprising a delay unit and a path metric calculation unit, FIGS. 3A and 3B shows parts of the conventional unit of FIG. 2, FIG. 4 shows a first embodiment of a device according to the invention, FIG. 5 shows a second embodiment of a device according to the invention, FIGS. 5A and 5B shows parts of the device of FIG. 5, FIG. 6A shows a combination of two partial trellises, FIG. 6B shows a third embodiment of a device according to the invention, FIGS. 7A and 7B each show a part of the device of FIG. 6A in more detail, FIG. 8 schematically shows an apparatus for reproducing a record carrier, FIG. 9 schematically shows a device for reproducing a transmitted signal.

Figure 4:
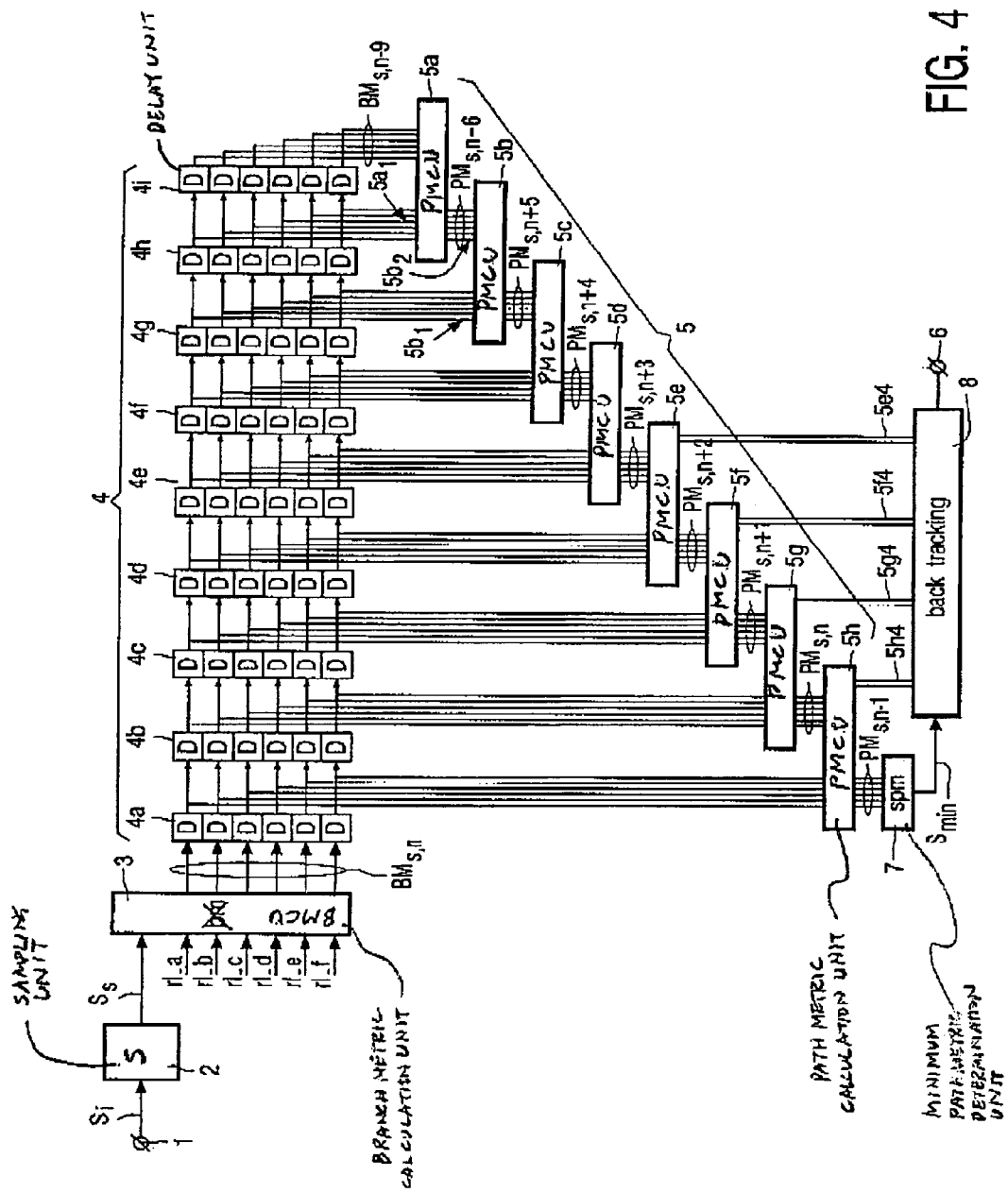

An embodiment of the device according to the invention for reconstructing a runlength limited sequence of n-ary digits from an analog input signal $S_i$ representing said sequence is shown in FIG. 4. The device shown comprises an input 1 for receiving said signal $S_i$. A sampling unit 2 for generating a sampled input signal $S_e$ with time-discrete samples $S_{s,n}$ of the input signal $S_i$ is coupled to the input 1. The device further comprises a branch metric calculation unit 3 for calculating a set of branch metric values $BM_{s,n}$ for subsequent samples $Ss_n$ of the sample input signal $S_s$. Each of the set of branch metric values $BM_{s,n}$ is an indication for the likelihood that an amplitude value of a sample corresponds to a particular state, a state being defined as a sequence of n-ary digits. In the embodiment of FIG. 4, the branch metric unit 3 calculates the branch metric values $BM_{a,n}, \ldots, BM_{r,n}$ for the states a, . . . ,f respectively. The device further is provided with a delay unit 4i and a path metric calculation unit 5a for calculating path metric values $PM_{s,n}$ out of the branch metric, values $BM_{s,o}$. The path metric calculation unit 5a is, coupled to the delay unit 4i. A path metric value $PM_{s,n}$ is an indication for the likelihood that a sequence of samples $S_{s,n}$ corresponds to a sequence of states St. The device shown has an output 6 for providing the reconstructed runlength constrained sequence Sr of n-ary digits.

The device according to the invention is characterized in that the delay unit 4i forms part of a delay chain 4 of delay units 4a, . . . ,4i. A first delay unit 4a of the chain 4 is coupled to the branch metric calculation unit 3. The path metric calculation unit 5a forms part of a path metric calculation chain 5 of path metric calculation units 5a, . . . ,5h. The path metric calculation chain 5 comprises one or more path metric calculation units 5b having first inputs 5b1 coupled to a delay unit 4g and second inputs 5b2 coupled to a preceding path metric calculation unit 5a.

The device is provided with a minimum pathmetric determination unit 7 which is coupled to the last pathmetric calculation unit 5h in the chain 5. The minimum pathmetric determination unit 7 generates a signal $S_{min}$ indicating which of the states a, . . . ,f has the minimum pathmetric from the pathmetric values $PM_{a,n-1}$ to $PM_{f,n-1}$.

The signal Smin is provided to a backtracking unit 8, which further receives predecessor information 5e4, 5f4, 5g4, 5h4 from the path metric calculation units 5e, 5f, 5g and 5h. The backtracking unit 8 calculates the state which has the highest likelihood of corresponding to the sample $S_{s,n-5}$. The backtracking unit starts backtracking from the state indicated by the signal $S_{min}$.

In the embodiment shown in FIG. 4 the path metric calculation chain 5 comprises at least a path metric calculation unit 5a with first inputs 5a1 coupled to a delay unit 4h, and with outputs 5a3 coupled to second inputs 5b2 of a first further path metric calculation unit 5b, said further path metric calculation unit 5b being provided with first inputs 5b1 which are coupled to a further delay unit 4g preceding the delay unit 4h.

As shown in FIG. 4 the device according to the invention calculates the pathmetric values in a pipelined way, so that more than one clockcycle is available for the calculation of each pathmetric value. When the branchmetric values BMn,s are available, the pathmetric calculation unit 5a of the device calculates $PMS^1_{s,n+6}$ which is the first stage of the calculation of PMs,n+6. At the same time the pathmetric calculation unit 5b of the device calculates $PM^2_{s,n+5}$, which is the second st $PM^3_{s,n+4}$ age of the calculation of PMs,n+5. Simultaneously the pathmetric calculation units $PM^3_{s,n+4}$ 5c, 5d, 5e, 5f, 5g calculate $PM^3_{s,n+4}$, $PM^4_{s,n+3}$, $PM^5_{s,n+2}$, $PM^6_{s,n+1}$ and $PMS^7_{s,n}$ and PMs,n−1.

Another embodiment of the device according to the invention is shown in FIG. 5. Herein the trellis is build in an opposite direction, namely towards the past. Said embodiment differs form the embodiment shown in FIG. 4, in that the chain of path metric calculation units 105 comprises at least a path metric calculation unit 105a with first inputs $105_{a1}$ coupled to a delay unit 104b, and with outputs $105_{a3}$ coupled to second inputs $105_{b2}$ of a second further path metric calculation unit 105b. The further path metric calculation unit 105b is provided with first inputs $105_{b1}$ which are coupled to a further delay unit 104c succeeding the delay unit $104_b$. In this embodiment of FIG. 5 the state which has the highest likelihood of corresponding to the sample $S_{s,n-5}$ is calculated by forward tracking, starting signal $S_{min}$ generated by the minimum pathmetric determination unit 107 indicates which of the states a, . . . ,f has the minimum pathmetric from the pathmetric values $PM_{a,n-1}$ to $PM_{f,n-1}$. As all the branch-metric values are available in the delay chain for each of the states for the samples $S_{s,n-1}$ to $S_{s,n-9}$ the minimum pathmetric value may be calculated in any order. In the embodiment of FIG. 5 the set of pathmetric values $PM_{s,n-k}$ for a point in time n-k calculated by a pathmetric calculation unit is calculated from the set of branch metric values for a sample $S_{s,n-k}$ of input signal for that point in time and the set of path metric values $PM_{s,n-k+1}$ for the succeeding point in time n-k+1.

In the embodiment of FIG. 5 the pathmetric calculation units 105a, . . . ,105h respectively calculate respective stages of the pathmetric values PMs,n−2, . . . ,PMs,n−9 simultaneously.

In the present embodiment the states b, c, e and f respectively have the logical successors a, b, d and e. With logical successors it is indicated that the latter mentioned states do not succeed the former mentioned states in a temporal sense, but succeed these states if the trellis is traversed backwards in time. Hence, the path metric value $PM_{b,n-k}$, for example, is calculated for example by addition of the pathmetric value $PM_{b,n-k+1}$ and the branch metric value $BM_{b,n-k}$ for state b. State a has states a and b as potential logical successor, and state d has states d and e as potential logical successors. Hence, the pathmetric value $PM_{a,n-k}$ is calculated by adding the branch metric value $BM_{a,n-k}$ for state a to the minimum of the pathmetric values $PM_{s,n-k+1}$ for its logical successors a and b. This is illustrated in FIGS. 5A and 5B.

Figure 1B:
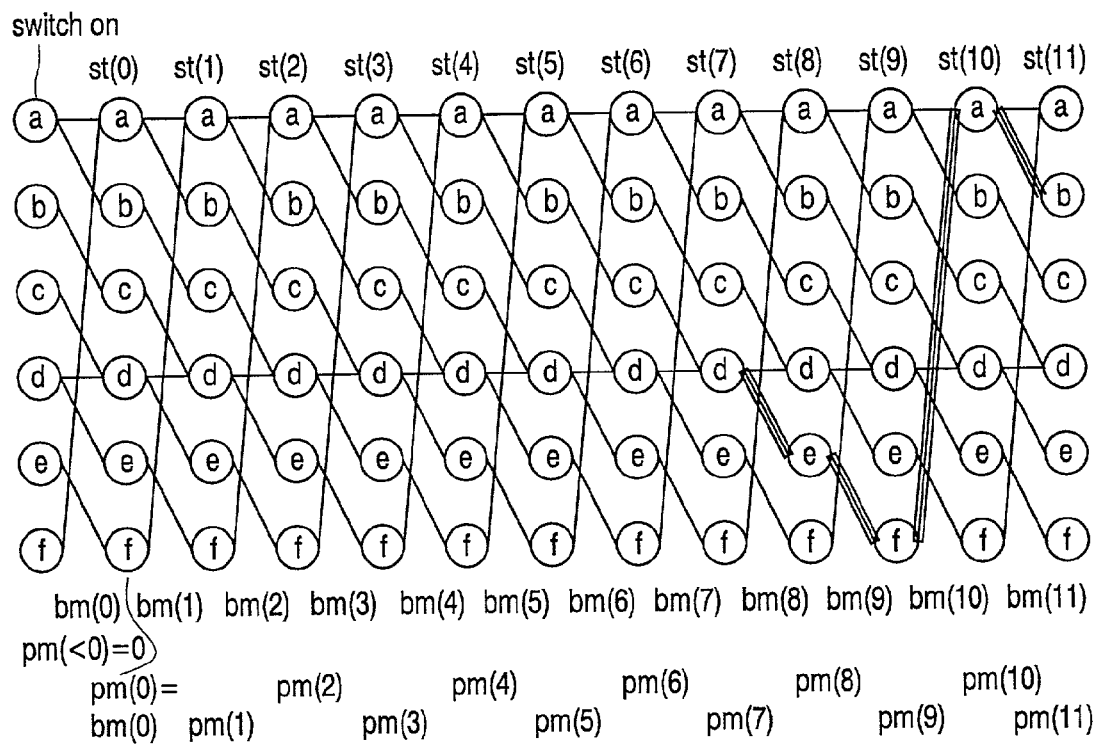

As shown in FIG. 6A, the trellis of FIG. 1B can also be considered as a combination of two merging partial trellises, based on this insight, a further embodiment of the device of the invention is shown in FIG. 6B. The device of FIG. 6B partly follows the trellis in chronological order and partly in anti-chronological order. The device shown in FIG. 6B comprises a first pathmetric calculation chain 205 of path metric calculation units which are coupled to the delay units of the delay chain 204 in the same order as in the embodiment of FIG. 4, i.e. mutually succeeding path metric calculation units are coupled to mutually preceding delay units. The device further comprises a second pathmetric calculation chain 205' of pathmetric calculation units which are coupled to the delay units of the delay chain 204 in the same order as the embodiment of FIG. 5. i.e. mutually succeeding path metric calculation units are coupled to mutually succeeding delay units. The device shown in FIG. 5 is provided with a third further path metric calculation unit $205_c$. This unit has first inputs $205_{c1}$ coupled to the first further path metric calculation unit $205_a$ and second inputs $205_{c2}$ coupled to the second further path metric calculation unit $205_b$. The state indicated by the signal Smin having the lowest path metric value is the detected state in this case, so that a backtracking or forward tracking unit is superfluous in this embodiment.

Figure 7A:
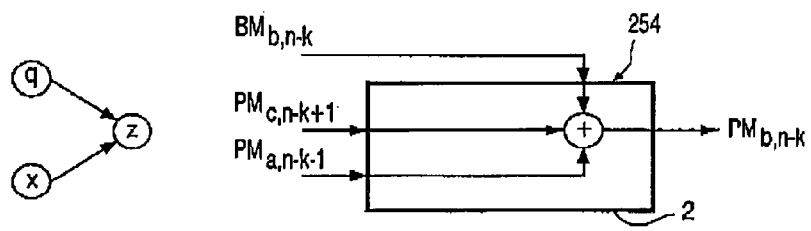
Figure 7B:
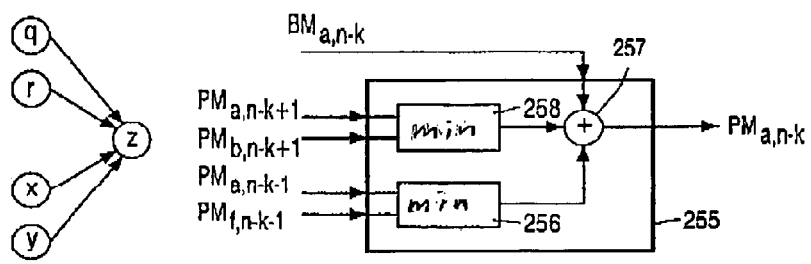

Parts of the third further path metric calculation unit $205_c$ are shown in more detail in FIGS. 7A and 7B. FIG. 7A shows a module 254 for calculating the path metric value $PM_{b,n-k}$ for state b. The module has a first input for receiving the path metric value $PM_{a,n-k-1}$ and a second input for receiving the path metric value $PM_{c,n-k+1}$. The module comprises an addition unit 254 for adding these pathmetric values $PM_{c,n-k+1}$ and $PM_{a,n-k-1}$ to the branch metric value $BM_{b,n-k}$ received at a third input so as to obtain the path metric value $PM_{b,n-k}$. The third further path metric calculation unit $205_c$ comprises identical modules for calculating the path metric values $PM_{c,n-k}$ $PM_{e,n-k}$ $PM_{f,n-k}$.

FIG. 7B shows another module 255 of the third further path metric calculation unit $205_c$. This module comprises first inputs for receiving the path metric values $PM_{a,n-k-1}$ and $PM_{f,n-k-1}$. These first inputs are coupled to a minimum value detector 256 which provides the smallest of these two path metric values to the addition unit 257. The module comprises second inputs for receiving the path metric values $PM_{a,n-k+1}$ and $PM_{b,n-k+1}$. These second inputs are coupled to another minimum value detector 258 which provides the smallest of these two path metric values to the addition unit 257. The addition unit 257 adds the smallest two path metric values selected by the minimum value detectors 256 and 258 to the branch metric value $BM_{a,n-k}$ so as to obtain the path metric value $PM_{a,n-k}$. The third further path metric calculation unit $205_c$ comprises a module identical to module 254 for calculating the path metric value $PM_{d,n-k}$.

The device shown in FIG. 7 comprises a unit 207 for determining which of the states a, . . . ,f has the minimum pathmetric value at time n–k, here n–5. Said state Smin is representative for the reconstructed n-ary value Sr. The reconstructed n-ary value Sr is preferably the central n-ary value of the sequence defining said state in the case that the sequence comprises an odd number of n-ary values. In the case that the sequence comprises an even number (2k) of n-ary values, the reconstructed n-ary value Sr is preferably the k-th or the k+1-th n-ary value.

FIG. 8 schematically shows an apparatus for reproducing a record carrier 9. The apparatus shown comprises a read unit 10 for generating a read signal in response to a pattern stored at the record carrier 9. The pattern stored at the record carrier may be for example a magnetically or an optically detectable pattern. The record carrier may for example be in the form of a tape, a card or a disc. The apparatus of FIG. 8 further comprises a device 11 according to the invention, for example an embodiment of the device as shown in one of the FIGS. 4, 5 and 6. The apparatus of FIG. 8 further comprises an error correcting and decoding unit 12 coupled to the output of said device for generating an error corrected signal Scorr from the reconstructed n-ary signal Sr. The unit 12 for example comprises a CIRC-decoder.

FIG. 9 schematically shows a receiver for reproducing a transmitted signal. The receiver comprises a receiving unit 20 for receiving and demodulating the transmitted signal. The transmitted signal is for example modulated on a carrier, by means of the QPSK, QAM or QFDM method. The demodulated signal is provided as the input signal to a device 21 according to the invention, for example an embodiment of the device as shown in one of the FIGS. 4, 5 and 6. Likewise, the apparatus of FIG. 9 further comprises an error correcting and decoding unit 22 coupled to the output of said device 21 for generating an error corrected signal scorr from the reconstructed n-ary signal Sr. The unit 22 for example comprises a CIRC-decoder.

It is remarked that the scope of protection of the invention is not restricted to the embodiments described herein. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features.

What is claimed is:

1. Device for reconstructing a runlength constrained sequence of n-ary digits from an analog input signal representing said sequence, the device comprising
   an input for receiving said signal,
   a sampling unit for taking time-discrete samples of the input signal,
   a branch metric calculation unit for calculating a set of branch metric values for subsequent samples of the sampled input signal, each of the set of branch metric values being an indication for the likelihood that an amplitude value of a sample corresponds to a particular state, a state being defined as a sequence of n-ary digits,
   a delay unit for delaying metric values,
   a path metric calculation unit, coupled to the delay unit, for calculating path metric values out of the branch metric values, a path metric value being an indication for the likelihood that a sequence of samples corresponds to a sequence of states,
   an output for providing the reconstructed runlength constrained sequence of n-ary digits and wherein the delay unit forms part of a delay chain of delay units, a first delay unit of the delay chain being coupled to the branch metric calculation unit, and the path metric calculation unit forms part of a path metric calculation chain of path metric calculation units, the path metric calculation chain comprising one or more path metric calculation units having first inputs coupled to a delay unit and second inputs coupled to a preceding path metric calculation unit.

2. A device according to claim 1, characterized in that the path metric calculation chain comprises at least a path metric calculation unit with first inputs coupled to a delay unit, and with outputs coupled to second inputs of a first further path metric calculation unit, said first further path metric calculation unit being provided with first inputs which are coupled to a further delay unit preceding the delay unit.

3. A device according to claim 1, characterized in that the chain of path metric calculation units comprises at least a path metric calculation unit with first inputs coupled to a delay unit, and with outputs coupled to second inputs of a second further path metric calculation unit, said further path metric calculation unit being provided with first inputs which are coupled to a further delay unit succeeding the delay unit.

4. A device according to claim 2, characterized by a third further path metric calculation unit having first inputs coupled to the first further path metric calculation unit and second inputs coupled to the second further path metric calculation unit.

5. An apparatus for reproducing a sequence from a record carrier, comprising
   a read unit for generating a read signal in response to a pattern stored at the record carrier,
   a device according to claim 3, receiving the read signal as its input signal,
   an error correcting and decoding unit coupled to the output of said device.

6. A receiver for reproducing a sequence from a transmitted signal, comprising
   a receiving unit for receiving and demodulating the transmitted signal,
   a device according to claim 4, receiving the demodulated signal as its input signal,
   an error correcting and decoding unit coupled to the output of said device.

7. A device according to claim 4, characterized by a third further path metric calculation unit having first inputs coupled to the first further path metric calculation unit and second inputs coupled to the second further path metric calculation unit.

8. An apparatus for reproducing a sequence from a record carrier, comprising
   a read unit for generating a read signal in response to a pattern stored at the record carrier,
   a device according to claim 1, receiving the read signal as its input signal,
   an error correcting and decoding unit coupled to the output of said device.

9. A receiver for reproducing a sequence from a transmitted signal, comprising
   a receiving unit for receiving and demodulating the transmitted signal,
   a device according to claim 1, receiving the demodulated signal as its input signal,
   an error correcting and decoding unit coupled to the output of said device.

* * * * *